United States Patent
Kwatra et al.

(10) Patent No.: US 11,907,981 B2
(45) Date of Patent: Feb. 20, 2024

(54) CONTEXT BASED ONLINE GARAGE OFFERING

(71) Applicant: International Business Machines Corporation, Armonk, NY (US)

(72) Inventors: Shikhar Kwatra, San Jose, CA (US); Raghuveer Prasad Nagar, Kota (IN); Jeremy R. Fox, Georgetown, TX (US); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 17/236,212

(22) Filed: Apr. 21, 2021

(65) Prior Publication Data
US 2022/0343384 A1    Oct. 27, 2022

(51) Int. Cl.
*G06Q 30/0601* (2023.01)
*G06Q 10/30* (2023.01)

(52) U.S. Cl.
CPC ..... *G06Q 30/0609* (2013.01); *G06Q 30/0611* (2013.01); *G06Q 30/0627* (2013.01); *G06Q 30/0641* (2013.01); *G06Q 10/30* (2013.01)

(58) Field of Classification Search
None
See application file for complete search history.

(56) References Cited

U.S. PATENT DOCUMENTS 6,708,174 B1 * 3/2004 Tenorio ............. G06F 16/24578
6,901,430 B1    5/2005 Smith
6,980,963 B1   12/2005 Hanzek
9,836,773 B2 * 12/2017 Bhojwani .......... G06Q 30/0611
(Continued)

FOREIGN PATENT DOCUMENTS

WO    WO-2006135784 A2 * 12/2006 ............. G06Q 10/08
WO    WO-2016100870 A1 *  6/2016 ......... G06Q 30/0611

OTHER PUBLICATIONS

Nada R. Sanders; "The impact of buyer firm information connectivity enablers on supplier firm performance a relational view"; 2011; The International Journal of Logistics Management (Year: 2011).*

(Continued)

*Primary Examiner* — Michelle T Kringen
(74) *Attorney, Agent, or Firm* — Monchai Chuaychoo (57) ABSTRACT

Embodiments herein disclose computer-implemented methods, computer program products and computer systems for context based online garage offering. The computer-implemented method may include receiving listing data from the seller users corresponding to items offered for sale, wherein the one or more seller users and one or more buyer users are registered with a web-based exchange platform based on user registration data; determining a seller context for the items based on the user registration data and the listing data; receiving historical item data for the items; determining disposal costs versus carry costs for the items based on the historical item data; determine potential buyers based on the listing data and potential buyer activity of the buyers; determining a buyer context based on the user registration data and the potential buyer activity; generating offer data for the items; and presenting the offer data to the seller users via a computing device user interface.

20 Claims, 5 Drawing Sheets

(56) References Cited

U.S. PATENT DOCUMENTS

| | | | |
|---|---|---|---|
| 10,445,767 B2* | 10/2019 | Laufenberg | G06F 3/1206 |
| 2004/0143600 A1* | 7/2004 | Musgrove | G06F 16/24575 |
| 2004/0193501 A1* | 9/2004 | Allen | G06Q 30/08 |
| | | | 705/26.2 |
| 2010/0131835 A1* | 5/2010 | Kumar | G06Q 30/0269 |
| | | | 715/205 |
| 2012/0310763 A1 | 12/2012 | Meehan | |
| 2014/0143061 A1 | 5/2014 | Abhyanker | |
| 2017/0287038 A1 | 10/2017 | Krasadakis | |
| 2020/0202421 A1 | 6/2020 | Kneen | |
| 2020/0342516 A1 | 10/2020 | Singh | |
| 2022/0051304 A1* | 2/2022 | Horen | G06Q 30/0623 |
| 2022/0383426 A1* | 12/2022 | O'Connor | G06Q 20/384 |

OTHER PUBLICATIONS

IBM, "IBM Websphere Commerce", Datanyze, Accessed on Jan. 25, 2021, 7 Pages.
Letgo, OfferUp, Inc., Accessed on Jan. 25, 2021, 14 Pages.
Wikipedia, "Right of first refusal", Wikipedia, Accessed on Jan. 25, 2021, 4 Pages.

* cited by examiner

| ITEM | SELL | DISPOSAL | REUSE/CARRY |
|---|---|---|---|
| BOOKSHELF | $275 | K/100 | $300 |
| CHAIR | $150 | K/100 | $100 |
| MONITOR | $100 | K/100 | $25 |
| FLOWERPOT | $10 | K/100 | $100 |

| CUSTOMER | BOOKSHELF | CHAIR | MONITOR | COUNTEROFFER |
|---|---|---|---|---|
| A | Y | Y | N | $400 |
| B | N | Y | N | $150 |
| C | Y | Y | Y | $500 |
| D | Y | N | Y | $350 |

CONTEXT BASED ONLINE GARAGE OFFERING

BACKGROUND

The present invention relates generally to the field of web-based goods exchange, and more particularly to optimal clustering and contextual offers for the sale of goods in an online marketplace.

It is estimated that people in the United States move on an average of 11.7 times throughout their lifetime based upon the current age structure and average rates and allowing for no more than one move per single year. While moving, although moving services are used to assist with the move, people end up selling some items to reduce the cost of moving. In the course of selling items, a price and term negotiation may ensue between the seller and potential buyer. Many online platforms facilitate the exchange of goods between seller and buyer and allow the parties to negotiate the terms of the exchange.

On-line shopping has therefore emerged as the preferred platform for buying and selling items, especially during a move where time is of the essence and the seller is budget conscious. In these transactions, potential buyers flood sellers with different kinds of queries. For example, potential buyers ask if an item already posted is available and sometimes along with counteroffers.

SUMMARY

The present invention is described in various embodiments disclosing computer-implemented methods, computer program products, and computer systems for context based online garage offering.

One embodiment of the present disclosure is a computer-implemented method for context based online garage offering, wherein the computer-implemented method may include one or more processors configured for receiving user registration data from two or more users in a web-based exchange platform. Further, the computer-implemented method may include registering one or more seller users and one or more buyer users in the web-based exchange platform based on the user registration data. In an embodiment, the computer-implemented method may include receiving listing data from the one or more seller users corresponding to one or more items offered for sale; determining a seller context for the one or more items offered for sale based on the user registration data and the listing data; receiving historical item data for each of the one or more items offered for sale.

In an embodiment, the computer-implemented method may include determining disposal costs versus carry costs for each of the one or more items offered for sale based on the historical item data; determining one or more potential buyers based at least on the listing data and potential buyer activity of the one or more buyer users; determining a buyer context based at least on the user registration data and the potential buyer activity; generating potential buyer clusters based on the seller context and the buyer context; generating offer data for each of the one or more items offered for sale, wherein the offer data includes a suggested offer price and associated buyer of the one or more potential buyers based at least on the potential buyer clusters; and presenting the offer data to the one or more seller users via a user interface of a computing device executing the web-based exchange platform.

In an embodiment, the user registration data may include seller registration data and buyer registration data corresponding to respective user demographic data, respective user profile data, and respective user location data. The web-based exchange platform may be one of a social media web-based platform or an online advertisement website.

In an embodiment, the listing data may include one or more of an item description, an item image, an item price, item social media activity, IoT item specific data, calendar data, and item specific search data. The item description may include one or more of a reason for the sale, a time to complete the sale, bundle items, transportation cost, and an upper limit for the sale.

In an embodiment, determining the seller context may include one or more processors configured for processing the item description to generate a first item context and generating the seller context based on the first item context and the item description. The potential buyer activity may include counteroffers made by and recent item search history of the one or more potential buyers.

DETAILED DESCRIPTION

A solution is needed to help sellers offering online items for sale (e.g., items users would sell/buy at a garage sale) that considers the selling context of seller users and the buying context of potential buyer users. A first aim of the seller is to maximize profit in selling items and a second aim of the seller is to minimize the operational consequences of not selling items. Some of the operational costs include disposal costs in time and money versus carrying costs to transport items to the future destination.

As an improvement, embodiments described herein provides computer-implemented methods, computer program products, and computer systems for optimal clustering and contextual selling of items with a cap in estimated budget to engage in buyer/seller negotiations. Embodiments described herein considers the explicit and implicit requirements of the potential buyers along with the derived expectations and constraints of the seller.

In an embodiment, users (also referred to herein as "seller users" and/or "buyer users") may register with a web-based exchange platform configured to facilitate the exchange of goods and/or services. Each user may provide information to create a profile within the online platform to engage with other users. For example, users may provide profile data corresponding to the user's identity, geographic location, and other pertinent information sufficient to conduct transactions within the platform.

Profile data may be gathered by providing a user interface as part of a computing device to a user so that the user may interact with the user interface to provide the profile data. The profile data may be stored in a memory on the computing device or may be transmitted via a network to a database or server corresponding to a social media platform. The web-based exchange platform executing on a server may be configured to allow users to create accounts by receiving information about the user in particular profile data fields. For example, the account may include a profile data field corresponding to profile information to receive personal information (e.g., name, date of birth, email address, location information, personal media content, etc.) about the user. The personal information may distinguish a particular user from other users or to allow users to be found within the platform using search features employing the personal information as search criteria.

In an embodiment, a seller user (e.g., Bob) is moving from a current city (e.g., NYC) to a future city (e.g., San Francisco), where Bob has many items at his residence and time is of the essence (e.g., move in the next 30 days). Bob may want to sell items in his current home office before leaving because he wants to set up a future new home office in San Francisco. Bob may also have decoration items for which he has not yet decided whether to sell or transport. Bob may also want to transport remaining items to San Francisco.

In order to try selling the items, Bob may make an online post providing details of the home office items, which includes a bookshelf, an ergonomic chair, a computer monitor, and a flowerpot. Bob expects $275 for the bookshelf, $150 for the chair, $100 for the monitor, and $10 for the flowerpot for a total of $535 for all items. Bob also understands that the disposal cost for the items is a variable based on the number of items left after the sale. For example, the variable may include a number of trips ("K") to the disposal site and the time/money value of making the trip may be $100. Bob may also determine that some items he may carry to the new place, which means they can be re-used to avoid the expense of repurchasing the items. However, Bob may be unsure on the accuracy of his predictions. Embodiments of the present invention provide a cost model chart for this example scenario.

In an embodiment, embodiments described herein may be configured to determine the disposal costs and the keep/carry costs for each item based on historical figures of what actually sold and the inverse of the replacement cost.

Further, embodiments described herein may include buyer users presenting counteroffers to Bob in response to the online posts. For example, a first buyer user may view Bob's online post advertisement for all the items and present a $400 counteroffer for all the posted items except the monitor. To recall, Bob offered the bookshelf for $275 and the chair for $150 for a total of $425. Thus, the first buyer's counteroffer is $25 less than Bob's desired price. A second buyer user may present a counteroffer of $150 for the chair alone, which is the price Bob wants for it but leaves Bob with the hassle of selling or carrying the remaining items. A third buyer user may present a counteroffer of $500 for the bookshelf, chair and monitor, which is $35 less than what Bob wants for those items and leaves the flowerpot to be decided on. And a fourth buyer user may present a counteroffer of $350 for the bookshelf and monitor, which is $25 less than Bob's desired price and leaves the chair and flowerpot to be decided on. Without the embodiments of this invention, Bob may get confused with questions he receives from buyer users along with their counteroffers and he may not be sure about whether he should wait for more offers from other buyer users or accept the proposed counteroffers. An example conclusion is that Bob accepts the third buyer user's counteroffer and sells the bookshelf, chair, and monitor for $500, $35 less than what he originally wanted and still having the flowerpot left to carry or dispose. However, this conclusion may not be the most ideal for Bob given his aims of maximizing profit and keeping operational consequences to a minimum.

In an embodiment, the computer-implemented method may include one or more processors configured for determining that the fourth buyer user will be keeping the bookshelf in a drawing room and recommending a custom proposal to Bob. The custom proposal may include accepting the counteroffer of $150 for the chair from the second buyer user and making another offer for the bookshelf and monitor for $400 to the fourth buyer user, but additionally offering the flowerpot to the fourth buyer user as a free item if the fourth buyer user accepts this offer. In an embodiment, determining that the fourth buyer user will be keeping the bookshelf in a drawing room may include gathering user activity data for the fourth buyer user corresponding to intentions regarding their search for the item for which the offer or counteroffer was proposed. For example, the fourth buyer user may have made a public post indicating a search for a bookshelf and monitor for an office that includes a central table. Thus, the one or more processors may be configured to use that information to make the custom proposal to Bob to include the flowerpot as a free item for the fourth buyer user's central table.

In an embodiment, the computer-implemented method may include one or more processors configured for making a recommendation to Bob to propose an offer to a fifth buyer user located in another city (e.g., Boston) who has been determined to need the bookshelf, chair, and monitor urgently. For example, the proposal to Bob concerning the fifth user may include soliciting an offer from the fifth buyer user for $610 for the bookshelf, chair, and monitor including shipping costs of $50.

In an embodiment, the computer-implemented method may include one or more processors configured for receiving an acceptance of the custom proposal from Bob confirming Bob's selection of one of the proposals suggested. For example, Bob may accept the custom proposal (i.e., accept $150 from the second buyer user and offer the bookshelf and monitor to the fourth buyer user for $400 with the flowerpot for free) and receive an image upload from Bob of one or more of the items included in the proposal (e.g., flowerpot and bookshelf), wherein the uploaded image(s) may be sent to the second buyer user for consideration of the offer. Further, the computer-implemented method may include one or more processors configured for accepting the revised offer from Bob and communicating the acceptance to Bob. As a result, Bob would end up with a better and faster disposition of all the items by selling the bookshelf and monitor to the fourth buyer user for $400, giving away the flowerpot for free to the fourth buyer user, and accepting the second buyer user's offer of $150 for the chair, resulting in total sales revenue of $550, which is $15 more than the $535 Bob originally wanted for all the items, within Bob's desired time frame and minimal operational costs.

In an embodiment, the computer-implemented method may include one or more processors configured to receive rejections (e.g., rejected offers) from buyer users and communicate those rejections to Bob.

In another embodiment, the computer-implemented method may include one or more processors configured for providing a right of first refusal within the contract offer between the seller user and a buyer user. A right of first refusal is a contractual right that gives its holder the option to enter into a business transaction with the owner of a valuable good or service, according to specified terms, before the owner is entitled to enter into that transaction with a third party. A first right of refusal must have three parties: the owner, the third party or buyer, and the option holder. In general, the owner must make the same offer to the option holder before making the offer to the buyer. The right of first refusal is similar to a call option. For example, a first buyer user may provide valuable consideration to a seller user to have the right of first refusal to purchase a good or service for a certain period of time. During that period of time, if a second buyer user makes an offer to purchase the good or service within the scope of the right of first refusal contract between the seller user and the first buyer user, then the seller shall present the offer to the first buyer user before accepting the second buyer's offer. The first buyer user may then have the opportunity to accept the seller user's offer according to the terms of the right of first refusal contract. If the first buyer user fails to accept the seller's offer, then the seller user may accept the second buyer user's offer without breaching the right of first refusal contract with the first buyer user.

The present invention will now be described in detail with reference to the Figures.

Figure 1:
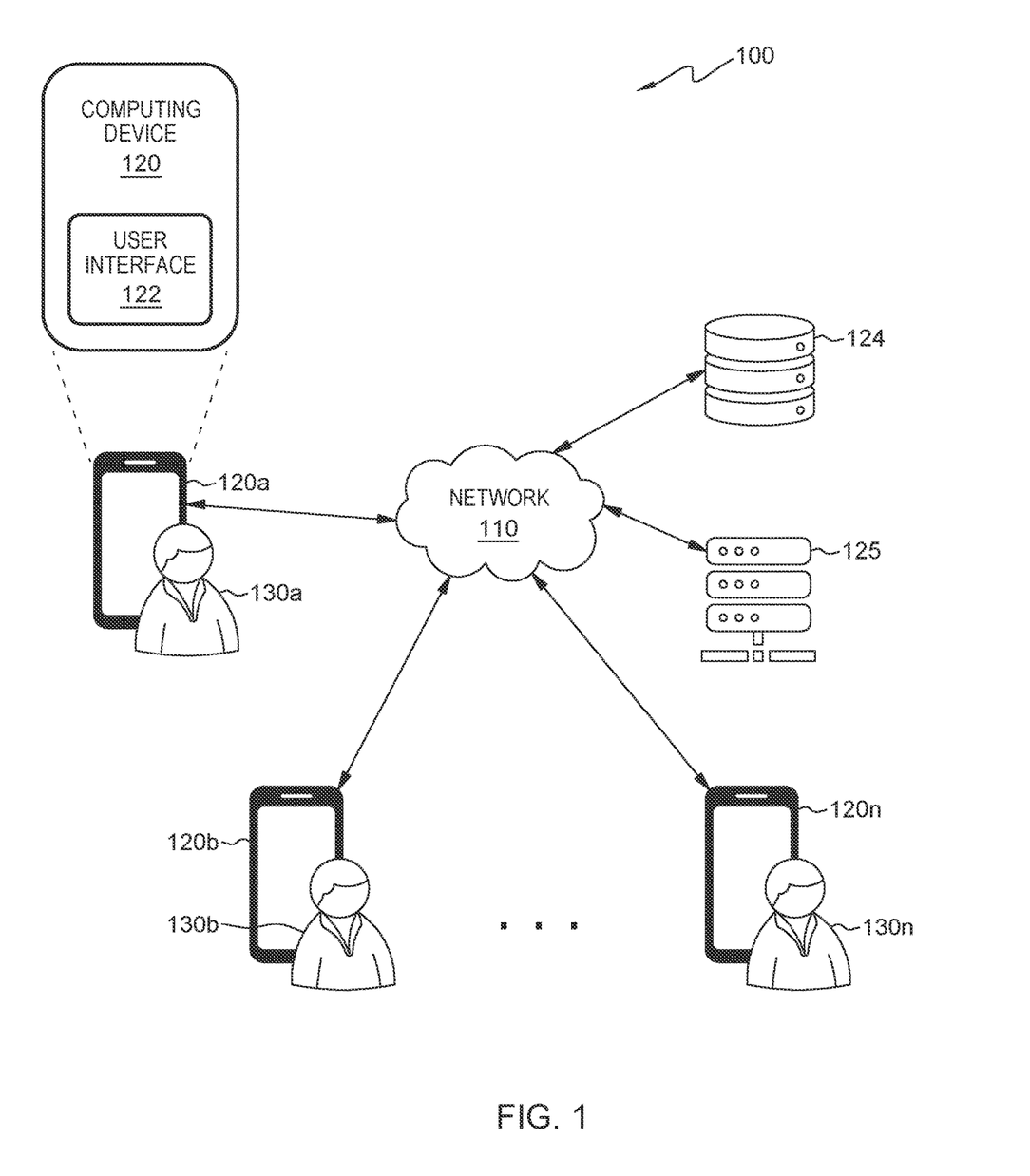
FIG. 1 depicts a block diagram of a distributed data processing environment for context based online garage offering, in accordance with an embodiment of the present invention.

FIG. 1 depicts a block diagram of a distributed data processing environment 100 for context based online garage offering, in accordance with an embodiment of the present invention. FIG. 1 provides only an illustration of one embodiment of the present invention and does not imply any limitations with regard to the environments in which different embodiments may be implemented.

In the depicted embodiment, distributed data processing environment 100 includes computing device 120a associated with a first user 130a, additional computing devices 120b . . . 120n associated with respective users 130b . . . 130n, server 125, and database 124, interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between computing device 120a, additional computing devices 120b . . . 120n, server 125, and database 124. Distributed data processing environment 100 may also include additional servers, computers, or other devices not shown.

Computing device 120a and additional computing devices 120b . . . 120n operate to execute at least a part of a computer program for context based online garage offering. In an embodiment, computing device 120a and additional computing devices 120b . . . 120n may be configured to send and/or receive data from one or more of the other computing device(s) via network 110. Computing device 120a and additional computing devices 120b . . . 120n may each include a user interface 122 configured to facilitate interaction between user 130 and computing device 120. For example, user interface 122 may include a display as a mechanism to display data to a user and may be, for example, a touch screen, light emitting diode (LED) screen, or a liquid crystal display (LCD) screen. User interface 122 may also include a keypad or text entry device configured to receive alphanumeric entries from a user. User interface 122 may also include other peripheral components to further facilitate user interaction or data entry by user associated with respective computing device 120.

In some embodiments, computing device 120a and additional computing devices 120b . . . 120n may be a management server, a web server, or any other electronic device or computing system capable of receiving and sending data. In some embodiments, computing device 120a and additional computing devices 120b . . . 120n may be a laptop computer, tablet computer, netbook computer, personal computer (PC), a desktop computer, a smart phone, or any programmable electronic device capable of communicating with database 124, server 125 via network 110. Computing device 120a and additional computing devices 120b . . . 120n may include components as described in further detail in FIG. 6.

Computing device 120a and additional computing devices 120b . . . 120n may be configured to receive, store, and/or process data corresponding to embodiments of the invention described herein. Computing device 120a and additional computing devices 120b . . . 120n may be configured to store the data in memory or transmit the data to database 124 and/or server 125 via network 110 for further storage and/or processing.

Database 124 operates as a repository for data flowing to and from network 110. Examples of data include profile data corresponding to data sources associated with a online garage offering account created on a web-based exchange platform. A database is an organized collection of data. Database 124 can be implemented with any type of storage device capable of storing data and configuration files that can be accessed and utilized by computing device 120a and additional computing devices 120b . . . 120n, such as a database server, a hard disk drive, or a flash memory. In an embodiment, database 124 is accessed by computing device 120a and additional computing devices 120b . . . 120n to store data corresponding to creating a user account on a web-based exchange platform, uploading media to the web-based exchange platform server, and interactions performed within the web-based exchange platform. In another embodiment, database 124 may reside elsewhere within distributed network environment 100 provided database 124 has access to network 110.

Server 125 can be a standalone computing device, a management server, a web server, or any other electronic device or computing system capable of receiving, sending, and processing data and capable of communicating with computing device 120a and additional computing devices 120b . . . 120n, and/or database 124 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 6.

Figure 2:
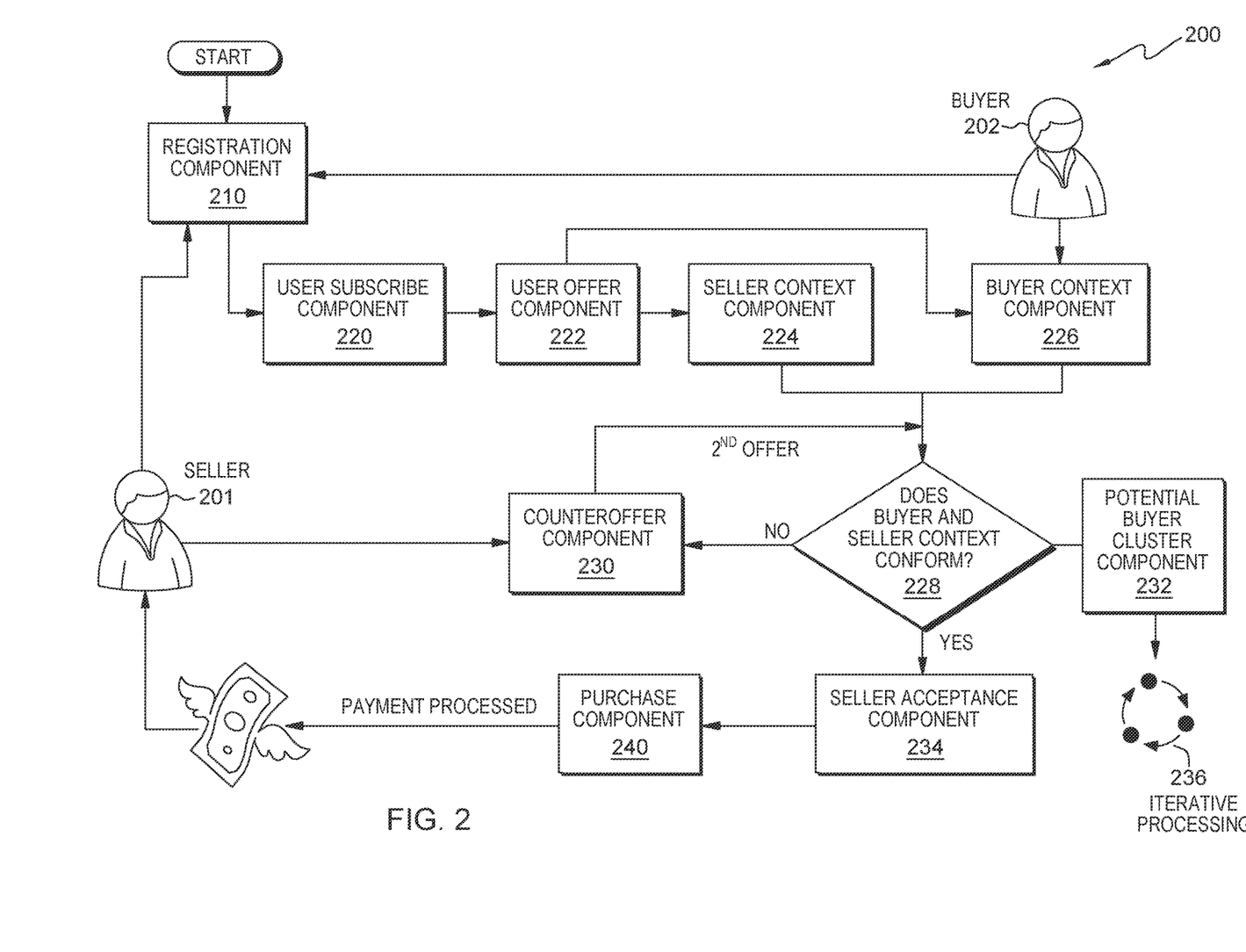
FIG. 2 depicts an example embodiment of a process flow diagram for context based online garage offering, in accordance with an embodiment of the present invention.

FIG. 2 depicts an example embodiment of a process 200 flow diagram for context based online garage offering, in accordance with an embodiment of the present invention.

In an embodiment, process 200 for context based online garage offering may include one or more processors configured to receive user registration data from two or more users in a web-based exchange platform. For example, process 200 may include a registration component 210 configured to receive user registration data (e.g., profile data) from seller 201 user and/or buyer 202 user to register them to the web-based exchange platform. Seller 201 user and buyer 202 user may provide information corresponding to user registration data to create a profile as a seller user and/or as a buyer user within the web-based exchange platform. A seller user is a user who provides a listing of one or more items for sale and a buyer user is a user to would like to purchase one or more items from a seller user. Registration component 210 may be a computer program executing in any electronic commerce (e-commerce) marketplace server, wherein a user interface is generated to receive a user identification and password to gain access or to create a profile to set preferences and provide user demographic datums, etc.

In an embodiment, process 200 may include user subscribe component 220 configured to receive the user registration data from registration component 210 and subscribe each user to the context based online garage offering service. For example, once a user is registered with the web-based exchange platform, the one or more processors may be configured to subscribe the registered users as a service within the web-based exchange platform. Subscribe component 220 is such as is typically found in electronic commerce marketplaces, where the profile for preferences and the demographic datums comprise a description of the interests of the buyer and seller user(s), wherein matched interest to items in the marketplace are packaged as an offer to sell to the buyer and as a report of offers made to the seller.

The user registration data may each include one or more profile data fields (e.g., data sources) comprising profile information, status updates, posted content, event information, group information, message data, and site interaction activity. Profile data may also include other data fields corresponding to activity performed within the web-based exchange platform.

In an embodiment, process 200 may include user offer component 222 configured to receive offers from seller 201 users and buyer 202 users. For example, seller 201 user may submit an item for sale as an offer to buyer 202 user, wherein the offer describes the item and includes a price for the item. Buyer 202 user may also submit an offer to purchase an item from seller 201 user. User offer component 222 may be configured to use artificial intelligence processes to generate recommendations to achieve a defined goal from a corpus, which in the context of the seller user may be different from the buyer user (e.g., maximize monetary benefit), or congruent (e.g., conclude transaction quickly).

In an embodiment, process 200 may include seller context component 224 configured to determine the context of selling, wherein the selling context may include a reason for the sale, additional items that the seller 201 user is willing to sell, time to complete the sale, transportation cost of the items offered for sale, upper cap of the offer, and other relevant considerations. Seller context component 224 may be configured to implement a ruleset that would achieve the goal defined for the seller user produced by user offer component 222 on the seller user side.

In an embodiment, process 200 may include seller context component 224 also configured to determine the context of selling for seller 201 user, wherein the selling context may be based on one or more of an explicit sale offer (e.g., seller 201 user offers a first item and a second item for sale), seller social media activity (e.g., seller 201 user make a post on a social media platform about being unsure whether to sell or transport a decorative item), seller IoT data (e.g., seller 201 user is moving to a new house in San Francisco that already has an office table making it better to sell the office table rather than transporting it), seller calendar data (e.g., seller 201 user is scheduled for a flight to San Francisco for a future date), and seller recent online searches (e.g., seller 201 user has queried a virtual assistant if it is a good idea to sell gardening items).

In an embodiment, process 200 may include buyer context component 226 configured to determine the context of buying, wherein the buying context may include one or more of a reason to buy (including a targeted event if that is the motivation for the purchase), additional items that buyer 202 user would be happy to buy, time constraints, and budget constraints. Buyer context component 226 may be configured to implement the ruleset that would achieve the goal defined for buyer 202 user produced by buyer offer component 226.

In an embodiment, process 200 may include buyer context component 226 configured to also determine the context of buying, wherein the buying context may be based on one or more of an explicit counteroffer (e.g., buyer 202 user offers to buy an item at a different price or with different terms that is listed by seller 201 user), buyer social media activity (e.g., social media post that buyer 202 user is looking for a good bookshelf for a drawing room), buyer IoT data (e.g., the bookshelf for sale cannot fit well in any part of the house except for the drawing room), buyer calendar data (e.g., buyer 202 user has invited colleagues for a deep discussion on quantum computing on a future date), and buyer recent online searches (e.g., buyer 202 user has queried a virtual assistant if it is a good idea to keep flowerpots on bookshelves). The explicit counteroffer may be received from user offer component 222 to use in determining the context of buying at buyer context component 226.

In an embodiment, process 200 may determine 228 if the buyer context and the seller context conform. If the buyer context and the seller context conform, then process 200 may be configured to facilitate seller user's acceptance of buyer's offer. For example, buyer and seller context conforms when the buyer and seller rulesets, as implemented by buyer context component 226 and seller context component 224, satisfy a predetermined threshold. In other words, if the buyer and seller rulesets are satisfied, respectively, then the buyer and seller context conform because the ruleset conditions match.

In an embodiment, if the buyer context and the seller context does not conform, then process 200 may be configured to facilitate a counteroffer between seller 201 user and buyer 202 user. For example, process 200 may include counteroffer component 230 configured to communicate a rejection to seller 201 user's offer by buyer 202 user, wherein buyer 202 user may communicate a new or different offer to seller 201 user at the same time or shortly after the rejection.

In an embodiment, process 200 may generate clusters of potential buyers from among the registered buyer 202 users. For example, process 200 may include potential buyer cluster component 232 configured to receive data from seller context component 224, buyer context component 226, and data corresponding to buyer/seller conformity to generate clusters of potential buyers for seller 201 user's items offered for sale. Further, potential buyer cluster component 232 may be configured to determine one or more potential buyers based at least on the user registration data and potential buyer activity. For example, potential buyers may be determined based at least on one or more of explicit counteroffers made by buyer 202 users and recent buyer 202 user searches (e.g., buyer 202 user has performed an online search for one or more items). In other words, potential buyer cluster component 232 may include computer programming instructions configured to execute a trial-and-error iterative process 236 to produce a more complete satisfaction of the buyer and seller contexts.

In an embodiment, the one or more processors may be configured to generate, using additional potential buyer cluster components 232, clusters of potential buyers using customer/user classification techniques (e.g., K-means clustering). For example, potential buyer cluster component 232 may be configured to evaluate a plurality of buyer profiles to determine if one or more of the buyer profiles match the subscription interest of seller 201 user's listed items for sale.

In an embodiment, process 200 may include an iterative processing 236 component configured to iteratively process data from potential buyer cluster component 232 to continuously generate clusters of potential buyers as the data is updated with changing information.

In an embodiment, process 200 may include seller acceptance component 234 configured to facilitate seller's acceptance of buyer's offer. For example, the one or more processors may be configured to determine 228 that the buyer context and the seller context conforms, thereby soliciting an acceptance of the outstanding offer from seller 201 user. Alternatively, if the one or more processors determine 228 that the buyer context and the seller context conform, seller acceptance component 234 may be configured to automatically accept the outstanding offer and advance to processing payment from buyer 202 user to seller 201 user.

In an embodiment, process 200 may include purchase component 240 configured to facilitate the transfer of consideration from buyer 202 user to seller 201 user once seller 201 user has accepted the terms of buyer 202 user's offer. For example, purchase component 240 may be configured to generate a payment portal to receive buyer 202 user data entry corresponding to a payment for the accepted price agreed upon by seller 201 user. Once the payment has been approved via the payment portal, the one or more processors may be configured to communicate a confirmation message to seller 201 user and to buyer 202 user indicating that the approved payment and associated details of the approval.

Figure 3:
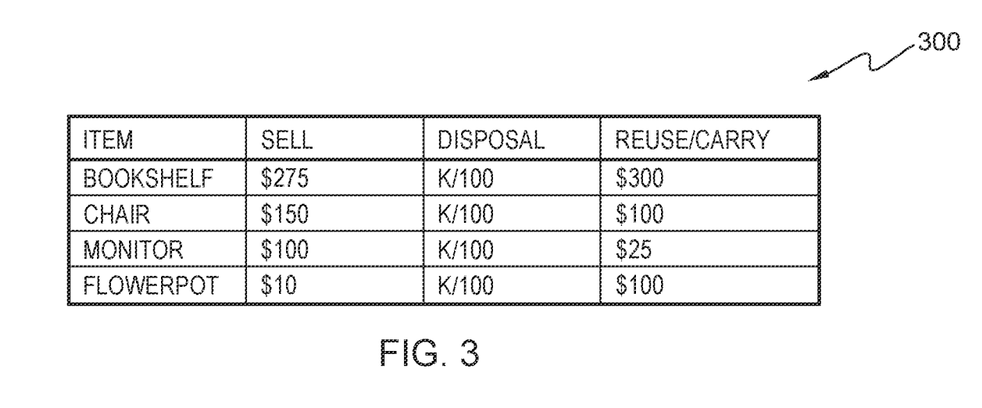
FIG. 3 depicts a cost model for context based online garage offering, in accordance with an embodiment of the present invention.

FIG. 3 depicts a cost model 300 for context based online garage offering, in accordance with an embodiment of the present invention.

In an embodiment, cost model 300 may include a cost chart including a list of items (e.g., bookshelf, chair, monitor, flowerpot) seller 201 user has offered for sale in the web-based exchange platform. The chart may also include a sell offer price (e.g., bookshelf—$275, chair—$150, monitor—$100, flowerpot—$10) for each item. Further, the chart may also include a disposal cost as a variable (e.g., K/100) based on the number of items left after the sale (e.g., K—number of trips to the disposal location) divided by the time-money value (e.g., 100) of making the disposal trip. Even further, the chart may also include a reuse/carry cost (e.g., bookshelf—$300, chair—$100, monitor—$25, flowerpot—$100) to reuse or carry the items to the future location as an estimate based on shipping costs, storage costs, etc.

In an example scenario, in order to try selling the items, Bob (e.g., seller 201 user) may make an online post providing details of the home office items, which includes a bookshelf, a chair, a monitor, and a flowerpot. Bob expects $275 for the bookshelf, $150 for the chair, $100 for the monitor, and $10 for the flowerpot for a total of $535 for all items. Bob also understands that the disposal cost for the items is a variable based on the number of items left after the sale. For example, the variable may include a number of trips ("K") to the disposal site and the time-money value of making the trip may be $100. Bob may also determine that some items he may carry to the new place, which means they can be re-used to avoid the expense of repurchasing the items.

In an embodiment, cost model 300 may be configured to determine the disposal costs and the keep/carry costs for each item based on historical figures of what actually sold and the inverse of the replacement cost. For example, the one or more processors may be configured to gather data corresponding to historical values of the cost to transport a particular item from one location to another location based on a number of variables. The historical value data may be provided to seller 201 user to assist in determining an optimal proposal for pricing items and for deciding whether to keep and carry items from a current location to a future location. The disposal costs are as commonly understood costs for disposal of an item and include the time and effort in transporting the item(s) to the appropriate disposal facility, as well as any fees incurred in the transportation and access to said facility. The carry cost is a similar cost that is accrued when an item must be cared for and is akin to what is commonly understood as the carrying cost of inventory, except for also adding the transportation cost of the kept item to a new location.

Figure 4:
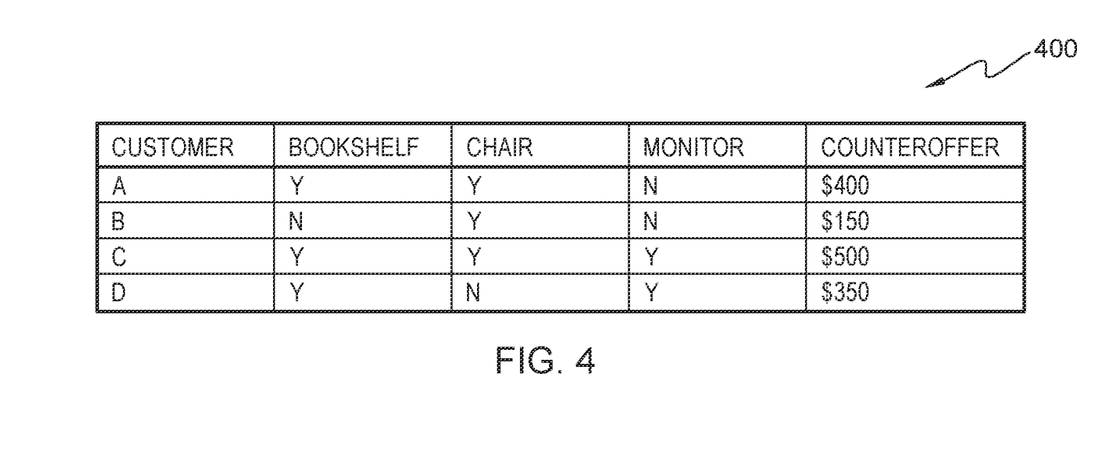
FIG. 4 depicts a counteroffer model for context based online garage offering, in accordance with an embodiment of the present invention.

FIG. 4 depicts a counteroffer model 400 for context based online garage offering, in accordance with an embodiment of the present invention.

In an embodiment, counteroffer model 400 may include a counteroffer chart including a first buyer user (e.g., Customer A) who may view Bob's (e.g., seller 201 user) online post advertisement for all the items and present a $400 counteroffer for all the posted items except the monitor. To recall, Bob offered the bookshelf for $275 and the chair for $150 for a total of $425. Thus, the first buyer user's counteroffer is $25 less than Bob's desired price. A second buyer user (e.g., Customer B) may present a counteroffer of $150 for the chair alone, which is the price Bob wants for it but leaves Bob with the hassle of selling or carrying the remaining items. A third buyer user (e.g., Customer C) may present a counteroffer of $500 for the bookshelf, chair and monitor, which is $35 less than what Bob wants for those items and leaves the flowerpot to be decided on. And a fourth buyer user (e.g., Customer D) may present a counteroffer of $350 for the bookshelf and monitor, which is $25 less than Bob's desired price and leaves the chair and flowerpot to be decided on. Bob may get confused with questions he receives from buyer users along with their counteroffers and he may not be sure about whether he should wait for more offers from other buyer users or accept the proposed counteroffers. An example solution of this example embodiment is that Bob accepts the third buyer user's counteroffer and sells the bookshelf, chair and monitor for $500, $35 less than what he originally wanted and still having the flowerpot left to carry or dispose. However, this conclusion may not be the most ideal for Bob given his aims of maximizing profit and keeping operational consequences to a minimum. But Bob may achieve an optimal solution using the embodiments described above herein by getting the most money for his items and minimizing his carrying costs.

Figure 5:
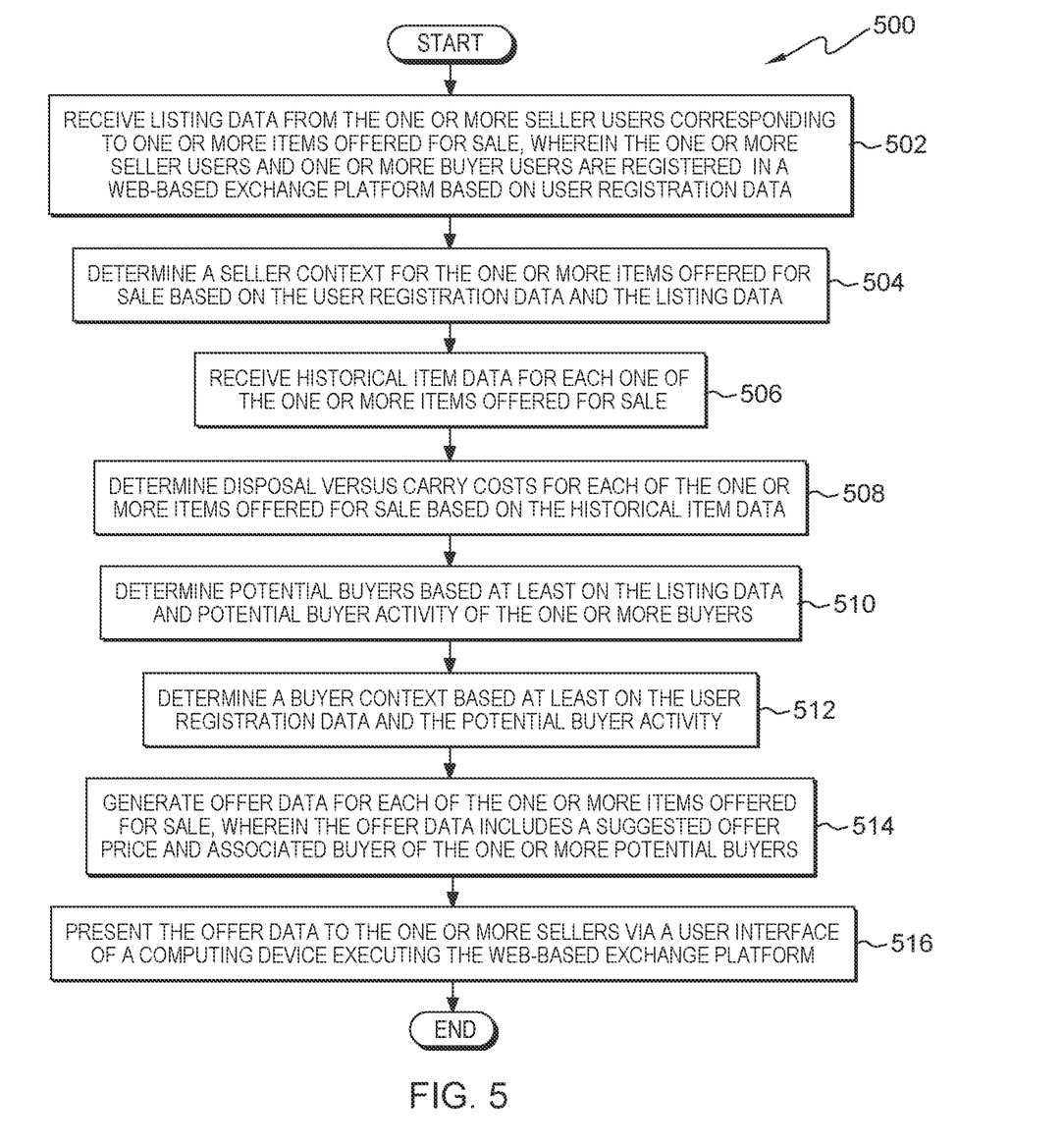
FIG. 5 depicts a flow chart of steps of a computer-implemented method for context based online garage offering, in accordance with an embodiment of the present invention.

FIG. 5 depicts a flow chart of steps of a computer-implemented method 500 for context based online garage offering, in accordance with an embodiment of the present invention.

In an embodiment, computer-implemented method 500 may include one or more processors configured to receive 502 user registration data from two or more users in a web-based exchange platform. In an embodiment, the user registration data may include seller registration data and buyer registration data corresponding to respective user demographic data, respective user profile data, and respective user location data. In an embodiment, the web-based exchange platform is one of a social media web-based platform or an online advertisement website.

In an embodiment, computer-implemented method 500 may include one or more processors configured to register 504 one or more seller users and one or more buyer users in the web-based exchange platform based on the user registration data.

In an embodiment, computer-implemented method 500 may include one or more processors configured to receive 506 listing data from the one or more seller users corresponding to one or more items offered for sale. In an embodiment, the listing data comprises one or more of an item description, an item image, an item price, item social media activity, IoT item specific data, calendar data, and item specific search data. The item description may include one or more of a reason for the sale, a time to complete the sale, bundle items, transportation cost, and an upper limit for the sale.

In an embodiment, computer-implemented method 500 may include one or more processors configured to determine 508 a seller context for the one or more items offered for sale based on the user registration data and the listing data. In an embodiment, the one or more processors configured to determine 508 a seller context may further include one or more processors configured to process the item description to generate a first item context, and generate the seller context based on the first item context and the item description.

In an embodiment, computer-implemented method 500 may include one or more processors configured to receive 510 historical item data for each of the one or more items offered for sale.

In an embodiment, computer-implemented method 500 may include one or more processors configured to determine 512 disposal costs versus carry costs for each of the one or more items offered for sale based on the historical item data.

In an embodiment, computer-implemented method 500 may include one or more processors configured to determine 514 one or more potential buyers based at least on the listing data and potential buyer activity of the one or more buyer users. In an embodiment, the potential buyer activity may include counteroffers made by and recent item search history of the one or more potential buyers.

In an embodiment, computer-implemented method 500 may include one or more processors configured to determine 516 a buyer context of the one or more potential buyers based at least on the user registration data and the potential buyer activity.

In an embodiment, computer-implemented method 500 may include one or more processors configured to generate 518 potential buyer clusters based on the seller context and the buyer context.

In an embodiment, computer-implemented method 500 may include one or more processors configured to generate 520 offer data for each of the one or more items offered for sale, wherein the offer data includes a suggested offer price and associated buyer of the one or more potential buyers based at least on the potential buyer clusters.

In an embodiment, computer-implemented method 500 may include one or more processors configured to present 522 the offer data to the one or more seller users via a user interface of a computing device executing the web-based exchange platform.

Figure 6:
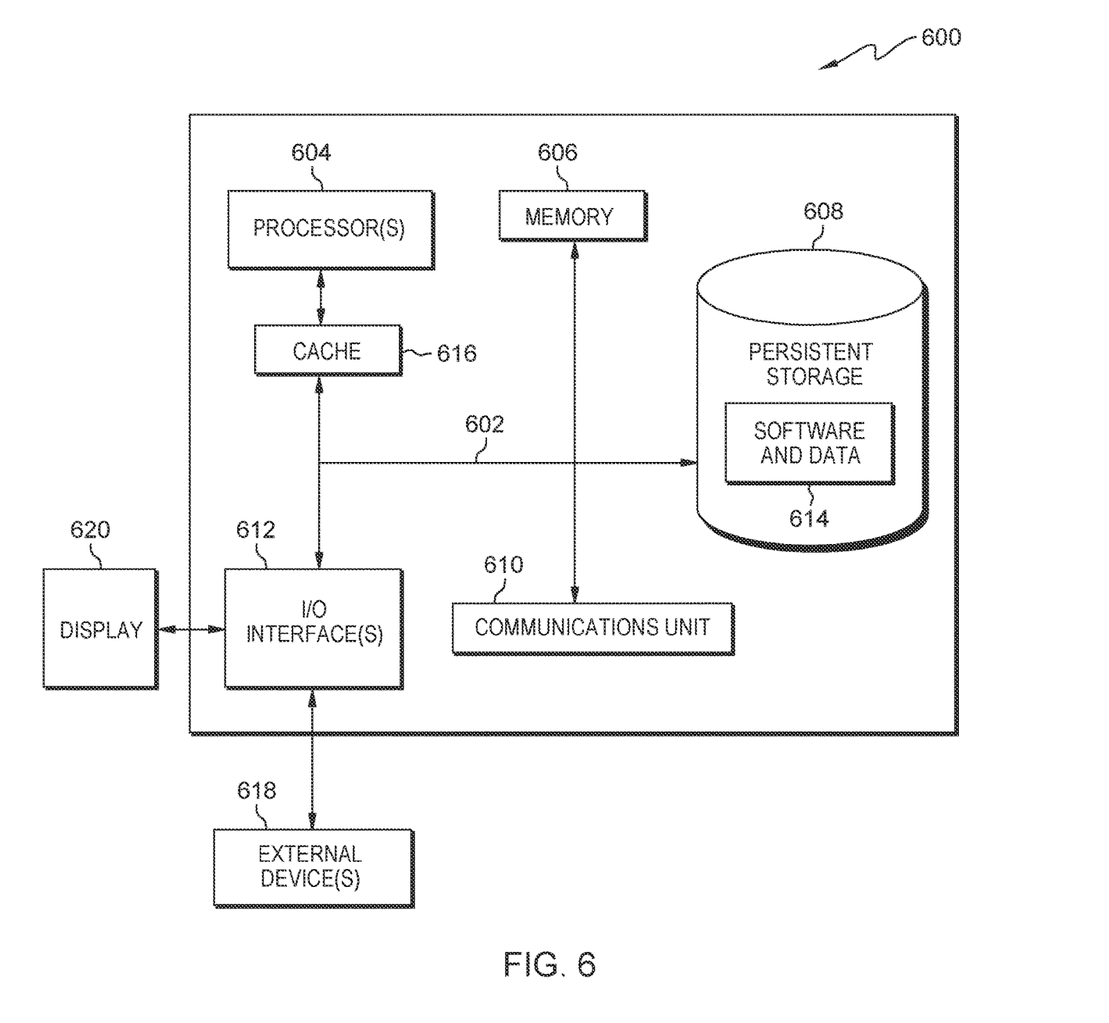
FIG. 6 depicts a block diagram of a computing device of the distributed data processing environment of FIG. 1, in accordance with an embodiment of the present invention.

FIG. 6 depicts a block diagram of computing device 600 suitable for server 125 and/or computing device 120, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Programs may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Programs, as described herein, may be downloaded to persistent storage 608 through communications unit 610.

I/O interface(s) 612 allows for input and output of data with other devices that may be connected to server 125 and/or computing device 120. For example, I/O interface 612 may provide a connection to external devices 618 such as image sensor, a keyboard, a keypad, a touch screen, and/or some other suitable input device. External devices 618 can also include portable computer readable storage media such as, for example, thumb drives, portable optical or magnetic disks, and memory cards. Software and data 614 used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Software and data 614 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a computer-implemented method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of computer-implemented methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for optimizing clustering and contextual sale of items within a web-based exchange platform, wherein the web-based exchange platform resides in a distributed network, the computer-implemented method comprising:
    registering, by one or more processors, two or more users with the web-based exchange platform;
    generating, by the one or more processor a user interface of the web-based exchange platform;
    creating, by the one or more processor, a profile for the two or more users using the user interface of the web-based exchange platform, wherein the profile corresponding to the two or more users designates the two or more users as a buyer user or a seller user on the web-based exchange platform;
    configuring, by the one or more processors, a seller context implementing a ruleset for achieving a goal defined by the at least one of the two or more users designated as the seller user, offering one or more items for sale on the web-based exchange platform, wherein the seller context is based on one or more explicit sale offer, social media activity of the seller user and IoT data of the seller user;
    configuring, by the one or more processors, a buying context implementing a ruleset for achieving a goal defined by the at least one of the two or more users designated as the buyer user, wherein the buying context includes time constraints and budget constraints and is based on one or more explicit counteroffer of the buying user, social media activity of the buying user and IoT data of the buying user;
    receiving, by a first virtual assistant that is executed by the one or more processors, an online search query from the seller user regarding whether the seller user should sell the one or more items;
    responding, by the first virtual assistant that is executed by the one or more processors, to the online search query from the seller user;
    receiving, by a second virtual assistant that is executed by the one or more processors, an online search query from the buyer user regarding whether the buyer user should keep certain items associated the one or more items;
    responding, by the second virtual assistant that is executed by the one or more processors, to the online search query from the buyer user;
    generating, by the one or more processor, clusters of potential buyers from among the two or more users registered with the web-based exchange platform designated with the profile corresponding to the buyer user, for one or more items for sale on the web-based exchange by the seller user using a user classification technique to evaluate a plurality of profiles of the potential buyers, matching the profiles of the potential buyers with subscription interests of the one or more items for sale on the web-based exchange platform, wherein the user classification technique is K-means clustering; and
    executing, by the one or more processor, a trial-and-error iterative process determining whether the buyer context of the buyer user selected from the cluster of potential buyers and the seller context conform, wherein conforming occurs upon the buyer ruleset and the seller ruleset being satisfied within a predetermined threshold, facilitating automatic acceptance of a buyer user's outstanding offer to purchase the one or more items for sale and advancing the contextual sale of items to processing of payment on the web-based exchange platform.

2. The computer-implemented method of claim 1, wherein registering the two or more users with the web-based exchange platform includes receiving, by the one or more processor, user registration data comprising seller registration data and buyer registration data corresponding to respective user demographic data, respective user profile data, and respective user location data.

3. The computer-implemented method of claim 1, wherein the web-based exchange platform is one of a social media web-based platform or an online advertisement website.

4. The computer-implemented method of claim 1, wherein offering the one or more items for sale on the web-based exchange platform includes receiving listing data from the seller user, the listing data comprising one or more of an item description, an item image, an item price, item social media activity, IoT item specific data calendar data, and item specific search data.

5. The computer-implemented method of claim 4, wherein the item description comprises one or more of a reason for the sale, a time to complete the sale, bundle items, transportation cost, and an upper limit for the sale.

6. The computer-implemented method of claim 5, wherein determining the seller context further comprises:
    processing, by the one or more processors, the item description to generate a first item context; and
    generating, by the one or more processors, the seller context based on the first item context and the item description.

7. The computer-implemented method of claim 1, wherein the buyer context is based on potential buyer activity comprising counteroffers made by the potential buyers and recent item search history of the potential buyers.

8. A computer program product for optimizing clustering and contextual sale of items within a web-based exchange platform, wherein the web-based exchange platform resides in a distributed network, the computer program product comprising: one or more computer readable storage media and program instructions stored on the one or more computer readable storage media, the program instructions comprising:

program instructions to register two or more users with the web-based exchange platform;

program instructions to generate a user interface of the web-based exchange platform;

program instructions to create a profile for the two or more users using the user interface of the web-based exchange platform, wherein the profile corresponding to the two or more users designates the two or more users as a buyer user or a seller user on the web-based exchange platform;

program instructions to configure a seller context implementing a ruleset for achieving a goal defined by the at least one of the two or more users designated as the seller user, offering one or more items for sale on the web-based exchange platform, wherein the seller context is based on one or more explicit sale offer, social media activity of the seller user and IoT data of the seller user;

program instructions to configure a buying context implementing a ruleset for achieving a goal defined by the at least one of the two or more users designated as the buyer user, wherein the buying context includes time constraints and budget constraints and is based on one or more explicit counteroffer of the buying user, social media activity of the buying user and IoT data of the buying user;

program instructions to receive, by a first virtual assistant, an online search query from the seller user regarding whether the seller user should sell the one or more items;

program instructions to respond, by the first virtual assistant, to the online search query from the seller user;

program instructions to receive, by a second virtual assistant, an online search query from the buyer user regarding whether the buyer user should keep certain items associated the one or more items;

program instructions to respond, by the second virtual assistant, to the online search query from the buyer user;

program instructions to generate clusters of potential buyers from among the two or more users registered with the web-based exchange platform designated with the profile corresponding to the buyer user, for one or more items for sale on the web-based exchange by the seller user using a user classification technique to evaluate a plurality of profiles of the potential buyers, matching the profiles of the potential buyers with subscription interests of the one or more items for sale on the web-based exchange platform, wherein the user classification technique is K-means clustering; and program instructions to execute a trial-and-error iterative process determining whether the buyer context of the buyer user selected from the cluster of potential buyers and the seller context conform, wherein conforming occurs upon the buyer ruleset and the seller ruleset being satisfied within a predetermined threshold, facilitating automatic acceptance of a buyer user's outstanding offer to purchase the one or more items for sale and advancing the contextual sale of items to processing of payment on the web-based exchange platform.

9. The computer program product of claim 8, wherein the program instructions to register the two or more users with the web-based exchange platform includes program instructions to receive user registration data comprising seller registration data and buyer registration data corresponding to respective user demographic data, respective user profile data, and respective user location data.

10. The computer program product of claim 8, wherein the web-based exchange platform is one of a social media web-based platform or an online advertisement website.

11. The computer program product of claim 8, wherein offering the one or more items for sale on the web-based exchange platform includes receiving listing data from the seller user, the listing data comprising one or more of an item description, an item image, an item price, item social media activity, IoT item specific data, calendar data, and item specific search data.

12. The computer program product of claim 11, wherein the item description comprises one or more of a reason for the sale, a time to complete the sale, bundle items, transportation cost, and an upper limit for the sale.

13. The computer program product of claim 12, wherein the program instructions to determine the seller context further comprises:

program instructions to process the item description to generate a first item context; and program instructions to generate the seller context based on the first item context and the item description.

14. The computer program product of claim 8, wherein the buyer context is based on potential buyer activity comprising counteroffers made by the potential buyers and recent item search history of the potential buyers.

15. A computer system for optimizing clustering and contextual sale of items within a web-based exchange platform, wherein the web-based exchange platform resides in a distributed network, the computer system comprising: one or more computer processors;

one or more computer readable storage media;

program instructions stored on the one or more computer readable storage media for execution by at least one of the one or more processors, the program instructions comprising:

program instructions to register two or more users the web-based exchange platform;

program instructions to generate a user interface of the web-based exchange platform;

program instructions to create a profile for the two or more users using the user interface of the web-based exchange platform, wherein the profile corresponding to the two or more users designates the two or more users as a buyer user or a seller user on the web-based exchange platform;

program instructions to configure a seller context implementing a ruleset for achieving a goal defined by the at least one of the two or more users designated as the seller user, offering one or more items for sale on the web-based exchange platform, wherein the seller context is based on one or more explicit sale offer, social media activity of the seller user and IoT data of the seller;

program instructions to configure a buying context implementing a ruleset for achieving a goal defined by the at least one of the two or more users designated as the buyer user, wherein the buying context includes time constraints and budget constraints and is based on one or more explicit counteroffer of the buying user, social media activity of the buying user and IoT data of the buying user;

program instructions to receive, by a first virtual assistant, an online search query from the seller user regarding whether the seller user should sell the one or more items;

program instructions to respond, by the first virtual assistant, to the online search query from the seller user;

program instructions to receive, by a second virtual assistant, an online search query from the buyer user regarding whether the buyer user should keep certain items associated the one or more items;

program instructions to respond, by the second virtual assistant, to the online search query from the buyer user;

program instructions to generate clusters of potential buyers from among the two or more users registered with the web-based exchange platform designated with the profile corresponding to the buyer user, for one or more items for sale on the web-based exchange by the seller user using a user classification technique to evaluate a plurality of profiles of the potential buyers, matching the profiles of the potential buyers with subscription interests of the one or more items for sale on the web-based exchange platform, wherein the user classification technique is K-means clustering; and program instructions to execute a trial-and-error iterative process determining whether the buyer context of the buyer user selected from the cluster of potential buyers and the seller context conform, wherein conforming occurs upon the buyer ruleset and the seller ruleset being satisfied within a predetermined threshold, facilitating automatic acceptance of a buyer user's outstanding offer to purchase the one or more items for sale and advancing the contextual sale of items to processing of payment on the web-based exchange platform.

16. The computer system of claim 15, wherein the program instructions to register the two or more users with the web-based exchange platform includes program instructions to receive user registration data comprising seller registration data and buyer registration data corresponding to respective user demographic data, respective user profile data, and respective user location data.

17. The computer system of claim 15, wherein offering the one or more items for sale on the web-based exchange platform includes receiving listing data from the seller user, the listing data comprising one or more of an item description, an item image, an item price, item social media activity, IoT item specific data, calendar data, and item specific search data.

18. The computer system of claim 17, wherein the item description comprises one or more of a reason for the sale, a time to complete the sale, bundle items, transportation cost, and an upper limit for the sale.

19. The computer system of claim 18, wherein the program instructions to determine the seller context further comprises:

program instructions to process the item description to generate a first item context; and program instructions to generate the seller context based on the first item context and the item description.

20. The computer system of claim 15, wherein the buyer context is based on potential buyer activity comprising counteroffers made by the potential buyers and recent item search history of the potential buyers.

* * * * *